(No Model.)
E. WILDA.
APPARATUS FOR PRODUCTION OF BEVERAGES.
No. 548,940. Patented Oct. 29, 1895.
Fig. I.
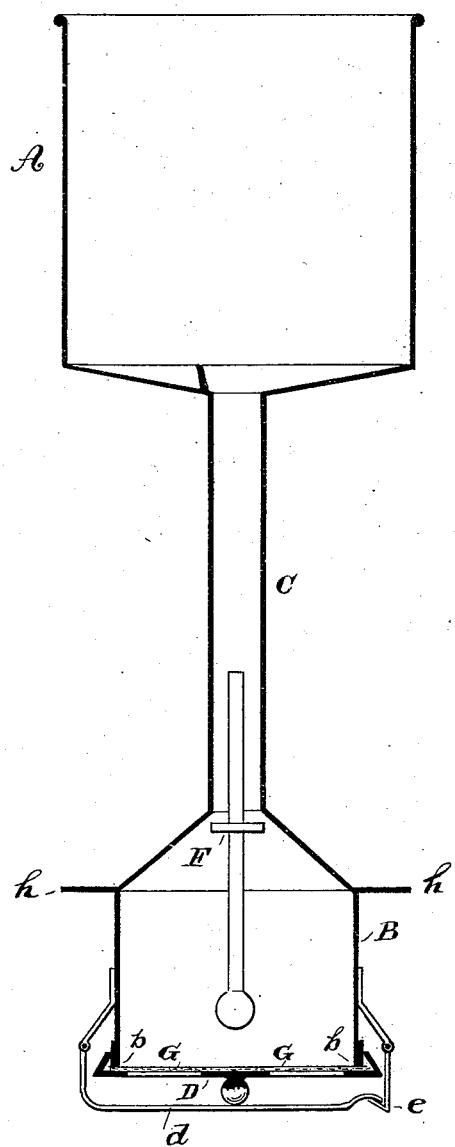
Fig. II.
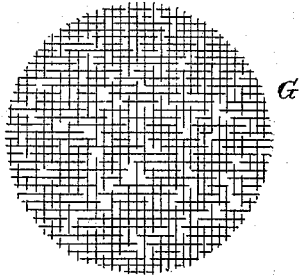
Fig. III.
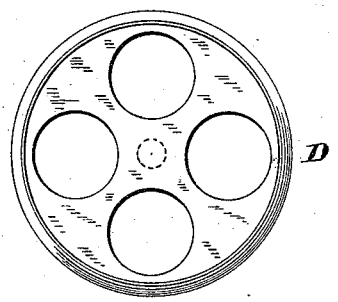
WITNESSES:
O. D. Mott
M. V. Bidgood
INVENTOR
Eugen Wilda
BY
ATTORNEYS.

UNITED STATES PATENT OFFICE.

EUGEN WILDA, OF SCHÖNEBERG, GERMANY.

APPARATUS FOR PRODUCTION OF BEVERAGES.

SPECIFICATION forming part of Letters Patent No. 548,940, dated October 29, 1895.

Application filed April 22, 1895. Serial No. 546,674. (No model.)

*To all whom it may concern:*

Be it known that I, EUGEN WILDA, a subject of the King of Prussia, German Emperor, residing at Schöneberg, near Berlin, in the Kingdom of Prussia and German Empire, have invented certain new and useful Improvements in Apparatus for the Production of a Beverage from Coffee Free from Oil and other Objectionable Substances, of which the following is a specification.

My invention relates to an apparatus designed to perfectly extract coffee from the ground berry free from oil and other objectionable substances, such as shells, and I will first describe the invention with reference to the accompanying drawings, and then point out in the claim the novel parts.

In said drawings, Figure I is a vertical sectional view of my improved apparatus. Fig. II is a plan view of the sealing and straining disk. Fig. III is a similar view of the perforated support therefor.

The apparatus consists, principally, of a vessel A, adapted to receive boiling water, a cylindrical vessel B, having a conical top and adapted to receive the ground coffee, a narrow tube C connecting the two vessels, made of considerable length, so as to provide sufficient water-pressure, and a valve F, whose stem is guided in said tube and which is adapted to close the lower end of said tube when the apparatus is inverted. The vessel B has a flange or shoulder $h$, whereby it may be supported on a coffee-pot, a straining-disk G, preferably of red flannel or similar fabric, and a perforated cover or holder D for said strainer. The cover D is pressed up against the rim $b$ of the vessel B by a hinged cleat $d$, held by catch $e$.

The manner of using the apparatus is as follows: The apparatus is inverted, the cover D and strainer G removed, and the vessel B is filled with ground coffee. In this position the valve F closes the tube C, so that no ground coffee can fall therethrough. The strainer G and cover D are then placed and fixed in position, as shown in Fig. I, and the apparatus is then placed in upright position on a coffee-pot and seated therein, so that its flange or shoulder $h$ rests upon the upper edge of the pot. Boiling water is then poured into the vessel A and passes through pipe C into the vessel B. It there mixes with the ground coffee, and the air rises in bubbles to the top and frees it from particles of oil and skin. On account of their small specific gravity these parts rise along the conical top of vessel B and through tube C, as may be plainly seen, up to the top of the water, and are, as the latter sinks through the tube C, deposited on the sides and bottom of vessel A. The coffee-liquor, however, passes through the flannel disk G and the perforated cover D free from oil and other objectionable substances in readiness for drinking.

Having thus described my invention, the following is what I claim as new therein and desire to secure by Letters Patent:

In a coffee extracting apparatus, the combination of the water receiving vessel A, the hydrostatic pressure tube C, the sliding valve F therefor, the conical top ground coffee receiving vessel B, the filtering disk G and the removable cover D, all arranged and adapted to operate, substantially as set forth.

In witness whereof I have hereunto set my hand in presence of two witnesses.

EUGEN WILDA.

Witnesses:
KARL FRAUSZE,
RUDOLF BRÖSEL.